US008462920B2

(12) United States Patent
Gonen et al.

(10) Patent No.: US 8,462,920 B2
(45) Date of Patent: Jun. 11, 2013

(54) REGISTRATION, VERIFICATION AND NOTIFICATION SYSTEM

(75) Inventors: Shlomo Gonen, Calabasas, CA (US); Jonathan A. Gonen, Calabasas, CA (US); Alon Gonen, Haifa, IL (US); Danny Rosen, Valley Village, CA (US)

(73) Assignee: TeleSign Corporation, Marina Del Rey, CA (US)

( * ) Notice: Subject to any disclaimer, the term of this patent is extended or adjusted under 35 U.S.C. 154(b) by 1601 days.

(21) Appl. No.: 11/538,989

(22) Filed: Oct. 5, 2006

(65) Prior Publication Data

US 2008/0010687 A1    Jan. 10, 2008

Related U.S. Application Data

(63) Continuation-in-part of application No. 11/034,421, filed on Jan. 11, 2005, now abandoned.

(51) Int. Cl.
    *H04M 11/00*    (2006.01)
(52) U.S. Cl.
    USPC ........................................ 379/93.12; 713/168
(58) Field of Classification Search
    USPC ................. 379/93.12; 370/352–356; 713/168
    See application file for complete search history.

(56) References Cited

U.S. PATENT DOCUMENTS

| | | |
|---|---|---|
| 5,881,226 A | 3/1999 | Veneklase |
| 5,995,606 A | 11/1999 | Civanlar et al. |
| 6,012,144 A | 1/2000 | Pickett |
| 6,044,471 A | 3/2000 | Colvin |
| 6,088,683 A | 7/2000 | Jalili |
| 6,097,791 A * | 8/2000 | Ladd et al. .................. 379/88.19 |
| 6,167,518 A | 12/2000 | Padgett et al. |
| 6,175,626 B1 | 1/2001 | Aucsmith et al. |
| 6,256,512 B1 * | 7/2001 | Verdonk .................... 455/554.1 |
| 6,259,909 B1 | 7/2001 | Ratayczak et al. |
| 6,574,599 B1 | 6/2003 | Lim et al. |
| 6,934,858 B2 | 8/2005 | Woodhill |
| 7,043,230 B1 | 5/2006 | Geddes et al. |
| 7,233,790 B2 * | 6/2007 | Kjellberg et al. ............. 455/419 |
| 7,383,572 B2 | 6/2008 | Rolfe |
| 7,389,913 B2 * | 6/2008 | Starrs ............................ 235/379 |
| 7,574,733 B2 | 8/2009 | Woodhill |
| 7,870,599 B2 | 1/2011 | Pemmaraju |

(Continued)

FOREIGN PATENT DOCUMENTS

WO    WO-95/19593 A1    7/1995

OTHER PUBLICATIONS

Rose Maciejewski, Authentify Showcases Rapidly Deployable Two-Factor Online Authentication System at 28th Annual Computer Security Institute Conference, Chicago, IL, Oct. 23, 2001.

(Continued)

*Primary Examiner* — Simon Sing
(74) *Attorney, Agent, or Firm* — Perkins Coie LLP (57) ABSTRACT

A registrant provides at least one registrant electronic contact, such as a telephone number, during a registration process. The registrant's information may be compared to a database of such information. The registrant is verified by establishing a connection with the registrant via the registrant contact. The verification code is communicated to the registrant, which is input into an on-line form. Notification events are established, and the registrant is notified of the occurrence of a previously established notification event by establishing a connection with the registrant via the registrant contact.

22 Claims, 10 Drawing Sheets

U.S. PATENT DOCUMENTS

| | | | |
|---|---|---|---|
| 8,024,567 B2 * | 9/2011 | Han | 713/168 |
| 2003/0191712 A1 * | 10/2003 | Ohmae | 705/41 |
| 2003/0221125 A1 | 11/2003 | Rolfe | |
| 2004/0030607 A1 | 2/2004 | Gibson | |
| 2004/0030935 A1 | 2/2004 | Kai | |
| 2004/0254890 A1 | 12/2004 | Sancho et al. | |

OTHER PUBLICATIONS

Peter Tapling, Highly Auditable Self-Service Life-Cycle Management for Electronic Security Credentials, 2003 Annual Computer Security Applications Conference, Las Vegas, Nevada, 2003.

* cited by examiner

REGISTRATION, VERIFICATION AND NOTIFICATION SYSTEM

BACKGROUND OF THE INVENTION

The present invention generally relates to on-line or web-site registration. More particularly, the present invention relates to a process for verifying an on-line registration by a telephone connection separate from the on-line connection between the web-site and potential registrant. The present invention also relates to a process for notifying registrants of predetermined events using information obtained during the registration process.

With the increasing popularity of the Internet, and web-site surfing and usage, both commercial and personal, it has become increasingly popular to require users to register at the web-site in order to obtain information from the web-site, order goods through the web-site, etc. In some instances, the owners of the web-site wish to use the registration information to selectively target promotions, advertisements, etc. to the registrant and thus get a secondary gain in addition to having the registrant visit the web-site or use the services provided through the web-site. In other instances, the registrant's registration information is not used whatsoever, but instead, the registration information is kept completely confidential and is used only for the purposes of allowing the registrant to enter the web-site and obtain information or goods and services through the web-site.

Authentication is fundamental to every Internet transaction. Individuals and businesses who wish to engage in trade on-line must authenticate themselves by reliably establishing their identity, and presenting credentials as proof of that identity. However, when doing business on the Internet, potential registrants often register with untraceable or false e-mail addresses and phone numbers. This can compromise the intended purpose of the registration, create a breach of security and constitute fraud on the web-site owners.

Aside from Internet transactions, individuals and businesses may wish to have a notification procedure in place. For example, to prevent fraud or identity theft, either the business or individual may wish to be alerted to certain events. For example, a consumer may wish to be notified every time a withdrawal or more than one thousand dollars is requested from his checking account, or charged to his credit card. A business may wish to notify a consumer when more than five transactions post to a consumer's account within twenty-four hours. When credit cards, account numbers, and the like are stolen, these accounts are quickly drained of cash or credit over a short period of time. This can be largely avoided by notifying the account owner of these acts or even seeking his or her authorization before permitting such transactions to occur. Of course, this limits the financial liability for both the bank, as well as the consumer. There are other instances when such notification can be helpful, such as being alerted to when a teenage son or daughter charges more than $500.00 on their credit card, when automatic deposits occur, etc. There are also instances which are not financially based in which notification could benefit both the consumer as well as the business. For example, the consumer may want to be alerted to news information, updated sports scores, etc.

Accordingly, there is a continuing need for a method of verifying a registrant's identity, such as through the registrant's telephone number. There is also a continuing need for a method to notify a registrant, such as through the registrant's telephone number, of events which are established either by the individual registrant or the company through which the registrant is conducting services. The present invention fulfills these needs and provides other related advantages.

SUMMARY OF THE INVENTION

The present invention resides in a process for verifying the identity of a registrant, as well as using the registration information to notify the registrant of events that are either established by the registrant or the business through which the registrant has registered. Generally, the process comprises providing a registration form to a registrant, who at least partially completes the registration form. At least one registration electronic contact is provided by the registrant. The registrant is then verified, such as by establishing a connection with the registrant vis a vis at least one registrant contact. A verification code is then communicated to the registrant. The verification code is then input by the registrant into an on-line form or a telephone verification system.

In a particularly preferred embodiment, the registration form is provided in a web-site. The registrant is informed via the web-site that an electronic message is being sent to the registrant via the electronic contact, which is typically a telephone number. The electronic message may comprise a short message service (SMS) message received by registrant's telephone, or a voice message. The electronic message includes either the verification code or a verification system telephone number for the registrant to call to receive the verification code. Although the system typically establishes a telephonic connection with the registrant via the registrant's telephone number, the invention contemplates providing a system telephone number for the registrant to call to obtain this information. The verification code is then input by telephone using voice or keypad entry, or entered into a form on the web-site.

During the registration and verification process, the information provided by the registrant in the registration form may be compared to a database containing personally identifying information. For example, such personal identifying information can include registrant's names, telephone numbers, addresses, e-mail addresses, social security numbers, etc., to verify and authenticate that the registrant is who he or she represents themselves to be.

After registration, notification events are established. Establishing the notification events can be done by either the registrant and/or the business or other third party utilizing the system and process of the present invention. Such notification events may comprise a news event, or a request to access or alter registrant's account. For example, registrant's account may comprise a financial account. Upon the occurrence of a previously established notification event, the registrant is notified by establishing a connection with the registrant, typically by contacting the registrant through a telephonic connection with the registrant via at least one registrant telephone number provided by the registrant during the registration process.

The system of the present invention is designed so as to detect an answering machine message, and delay a predetermined amount of time before playing an automated message concerning the notification. If this occurs during the registration process, or a reverification process, the automated message includes the verification code.

If the telephone number provided by the registrant is not a direct-line number, or is a PBX number, the registrant during the registration process indicates that the telephone number requires an extension and whether a live operator will answer a call. In the event that a live operator answers the call, an automated message is played directing the live operator to dial the extension of the registrant. Afterwards, a pause for a predetermined amount of time occurs before an automated message is played which includes either the verification code or notifying the registrant of the occurrence of a preestablished event. However, if a live operator does not answer the call, after a pause, the extension is automatically dialed. After another pause, an automated message is played, including either the verification code or notification of the occurrence of the event.

The registrant may be required to reverify, as described above, before permitting access or alteration of the registrant's account or receiving notification of the occurrence of the preestablished event. The registrant may be charged for the notification.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a process for verifying the identity of a registrant, and utilizing the verification and/or registration information to notify the registrant of predetermined events established by either the registrant or the business.

Figure 1:
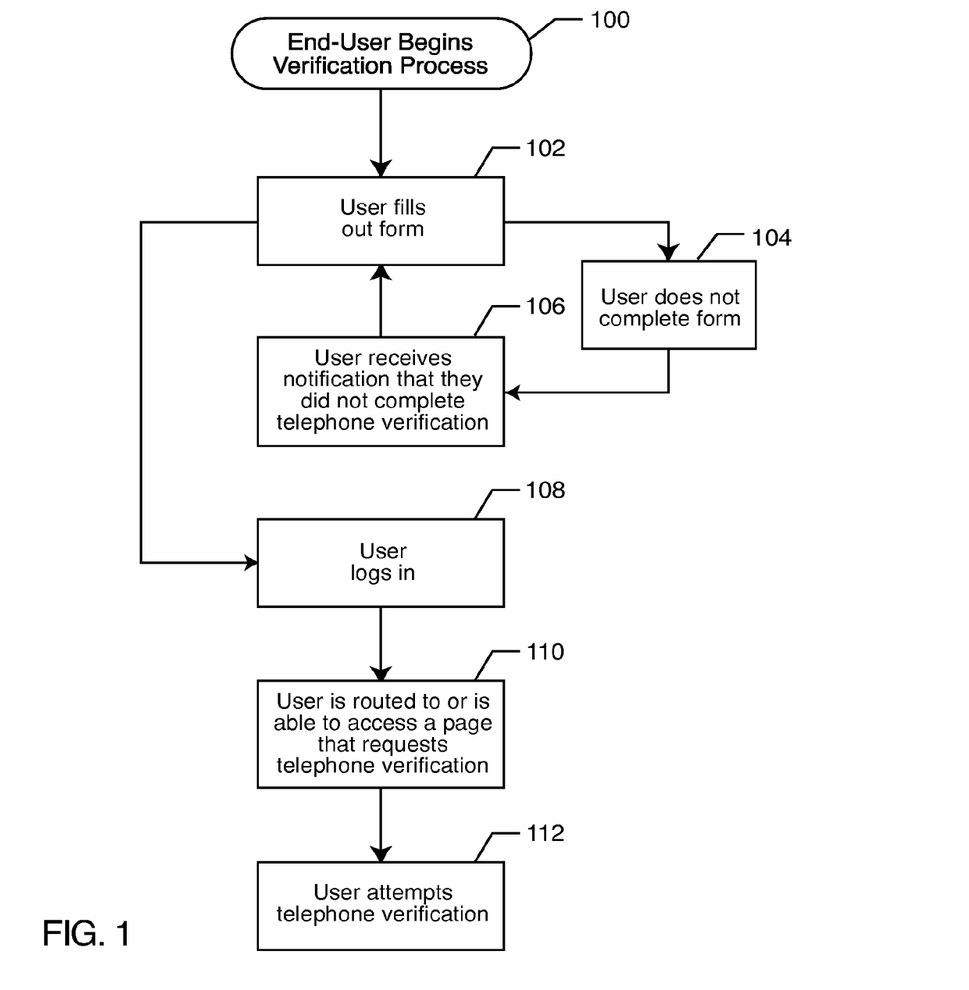
FIG. 1 is a flow chart depicting the general steps taken in accordance with the verification process of the present invention.

In a particularly preferred embodiment, as illustrated in FIG. 1, the registration process involves an on-line registration form accessed through a web-site. However, it will be appreciated by those skilled in the art that the registration form nor process need involve an on-line form. The verification and notification processes, as will be more fully described herein, could be achieved through other registration forms, such as a handwritten form. The registrant is contacted via an electronic contact, such as a telephone number. One premise of the present invention is that it is difficult to filter, stop, or penetrate a telephonic voice call, whereas other means of communication, including, but not limited to, text messaging, e-mail, etc., can be intercepted, stopped, automatically filtered, trashed, or deleted by a third party.

As used herein, a registrant or user is one filling out the registration form in order to register with the web-site or business. The registrant is typically a consumer, which can be an individual, but can also be companies, organizations, governments, etc. Typically, the registrant is registering with another business, which may also comprise an individual, company, or organization or government. For example, the registrant or consumer could be an individual attempting to access a web-site and set up an account with a financial institution. The various identities, types and the like of the consumer and business are varied, as is the purpose of registration and verification.

As illustrated in FIG. 1, the end-user or registrant begins the verification process (100), by filling out a form (102). Typically, this form is provided at a web-site. If the user does not complete the form (104), the user receives notification that they did not complete telephone verification (106). However, if the user does fill out the form, he or she is allowed to log in (108). The user is routed to, or is able to access, a page that requests telephone verification (110). The user then attempts telephone verification (112), as will be more fully described herein.

Figure 2:
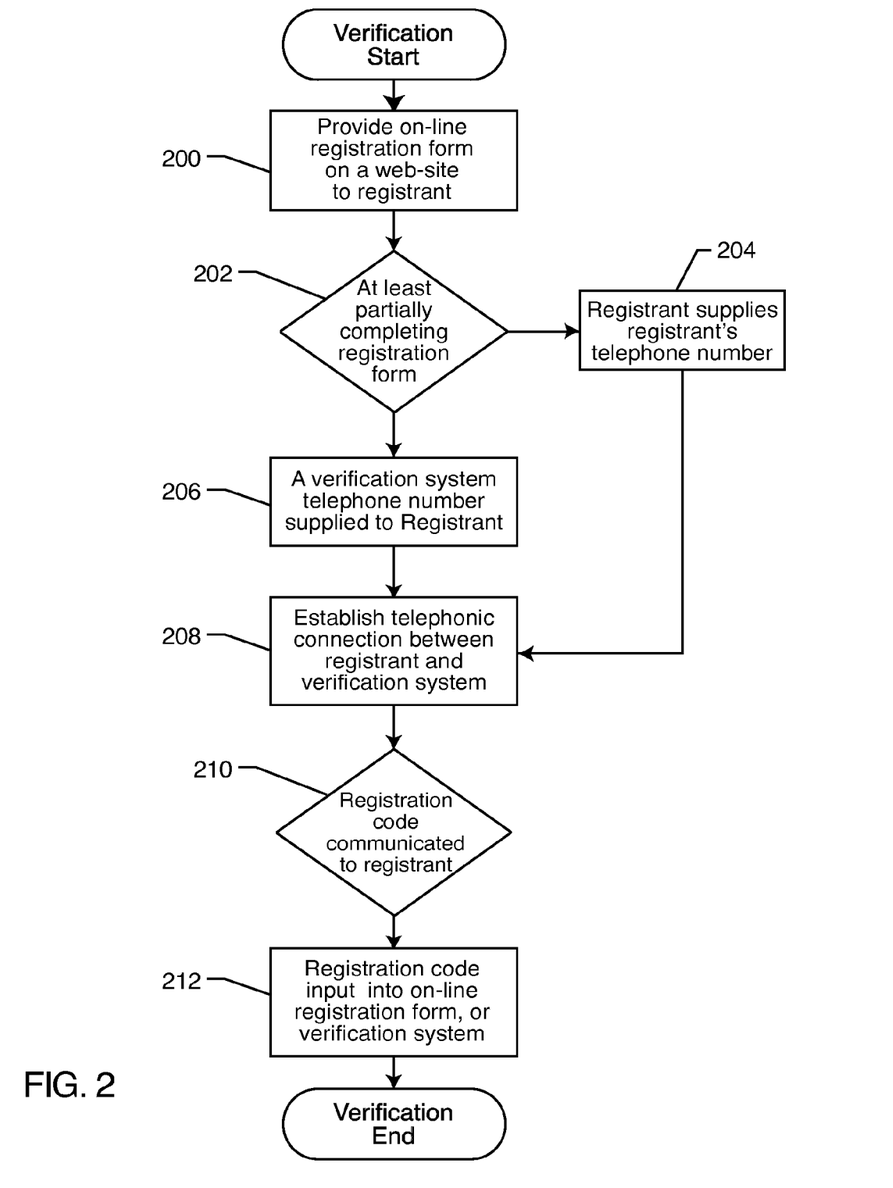
FIG. 2 is another flow chart depicting the steps of the verification process of the present invention.

With reference to FIG. 2, in one registration embodiment, an on-line registration form is provided to a potential registrant at a web-site (200), i.e., a first communication connection. The registrant at least partially completes a portion of the registration form (202). At the web-site, the registrant is prompted to supply his telephone number (204), or a verification system telephone number is supplied to the registrant and the registrant is prompted to call this number (206). A telephonic connection, i.e., a second communication connection, is established between the registrant and the verification system (208). During the registration process, a registration code is communicated to the registrant (210), i.e., through the second communication connection. The registration code is then input into the on-line registration form, or otherwise at the web-site, i.e., through the first communication connection (212). The verification and authentication is completed and the user is allowed to log into the web-site.

As described above, a present problem with on-line registrations is that the registrant often registers with untraceable and false e-mail addresses and telephone numbers. The present invention provides a process for verifying an on-line registration, or at least the true identity of the registrant's telephone number so as to provide an additional layer of security and reduce fraud. Thus, the registrant receives the registration code (210) through the telephone connection and is required to input the registration code into the verification system (212) through the on-line registration form or otherwise at the web-site. Not only does this method allow the user to be verified, but it also prevents fraud by requiring the registrant to enter the verification code back into the web-site connection where he/she completed the registration form (202). In the event of consumer or potential registrant verification failure, it is assumed that the registrant who is not verified through the verification system or through manual means is fraudulent. Therefore, the business may elect to contact the consumer to determine why the consumer verification failed. This contact may be completed by automated or manual means of communication between the business and the consumer, including, but not limited to, automatically generated e-mail, manually generated e-mail, manually or automatically generated telephone calls, text messaging, etc.

Figure 3:
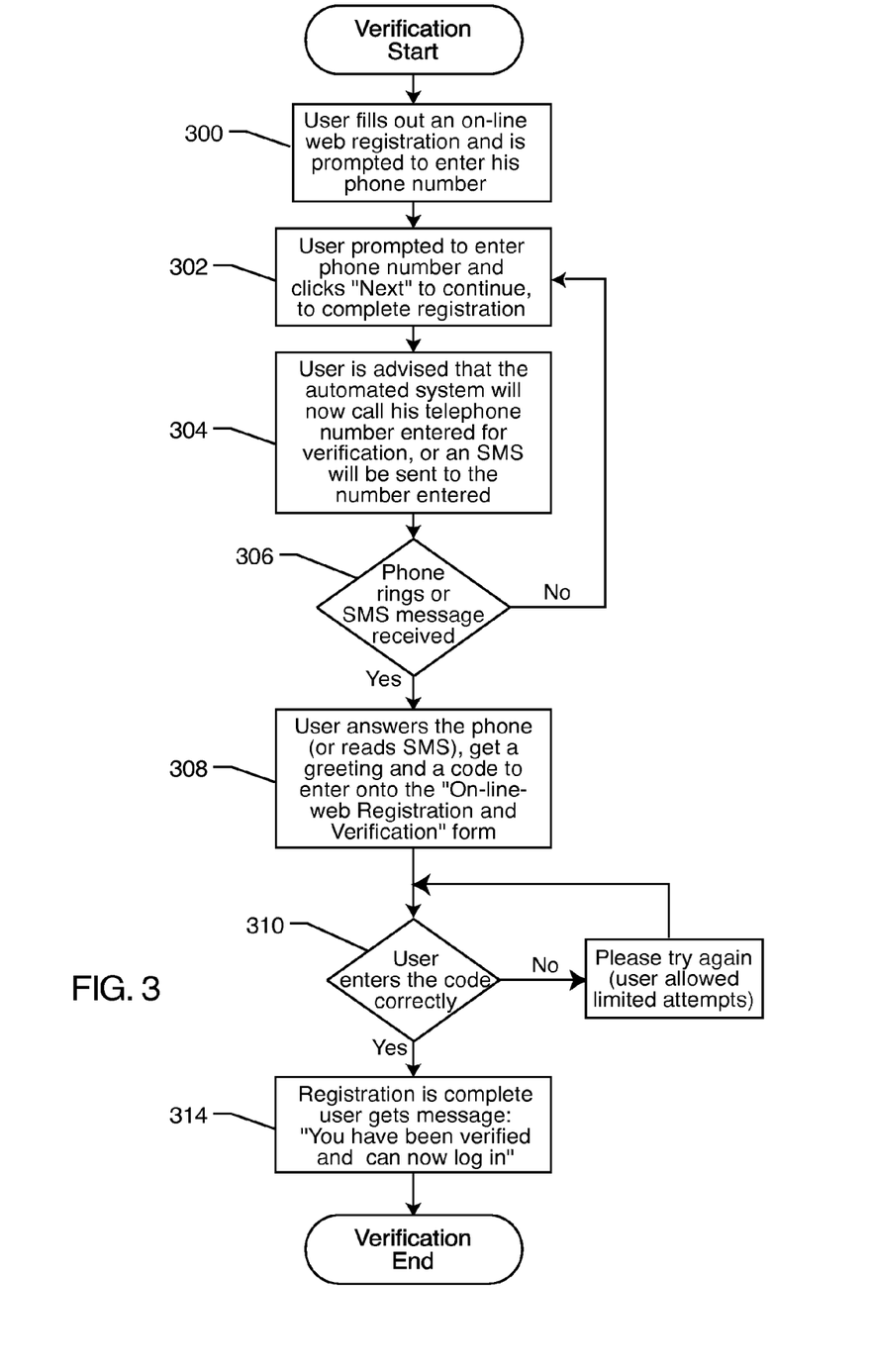
FIG. 3 is a flow chart depicting the steps of one embodiment of the present invention.

With reference now to FIG. 3, in another embodiment, the verification process begins by the registrant at least partially completing the on-line web registration form (300) on the web-site. At the web-site, the registrant is prompted to enter the registrant's telephone number (302). The registrant is advised that the automated system will now call his telephone number in search for verification (304). If the phone does not ring, indicating that the potential registrant has provided an untraceable or false telephone number, the user is once again prompted to enter his telephone number (302). However, if the phone rings and a connection is established between the registrant and a verification system (306), the registrant answers the telephone and obtains a greeting and a registration code to enter into the on-line web-site registration and verification form (308). The registrant is then given the opportunity to enter the registration code, typically a three digit code, into the on-line registration form (310) on the web-site. If the registrant does not correctly enter the code, the registrant is given another opportunity to do so (312). Typically, the registrant will be given a limited number of attempts to enter the registration code. This prevents potential registrants from attempting to enter a registration code by trial and error without providing the correct telephone number in order to obtain the correct registration code via telephone. However, if the registrant enters the code correctly, the registration is complete and the registrant obtains a message, such as "you have been verified and can now log in" (314) or the like. The registrant is then given access to the web-site or the services of the web-site for which registration is required. The authentication and verification process is concluded.

Figure 4:
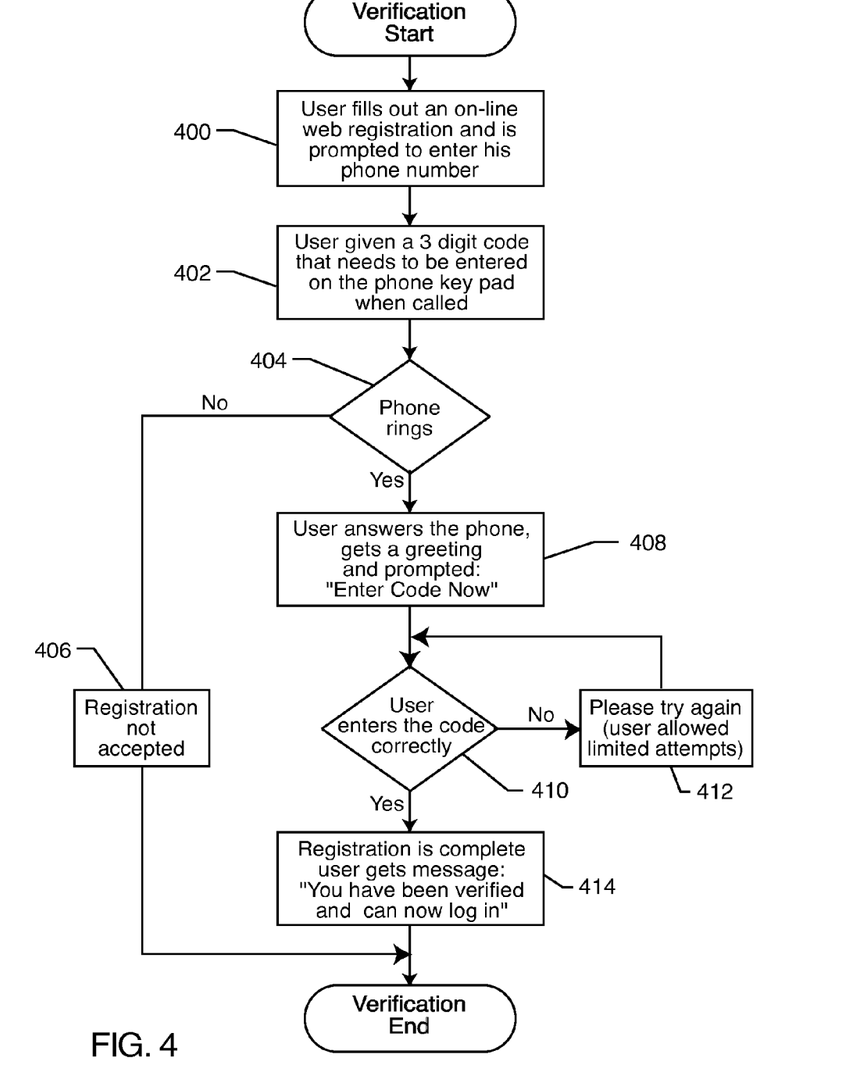
FIG. 4 is a flow chart depicting the steps taken in another embodiment of the present invention.

With reference now to FIG. 4, yet another verification and authentication process embodying the present invention is illustrated. The registrant completes, at least partially, an on-line web registration form, and during the registration process is prompted to enter his telephone number (400) on the web-site. The registrant is then given, at the web-site, a registration code that needs to be entered by phone when the registrant is called (402). A telephonic connection is then established by calling the telephone number provided by the registrant (404). If the phone does not ring and a telephonic connection is not established, the registration is not accepted (406), and the registrant may then be prompted again to register his telephone number (400).

However, if the phone rings and a telephonic connection is established, the registrant answers the phone and gets a greeting which includes a prompting to enter the registration code obtained at the web-site (408) through the telephone connection. The registrant is then given the opportunity to enter the registration code by telephone (410), such as by speaking into the phone such that the verification system of the invention is enabled with speech recognition software, or by entering the code via keypad or the like. If the registration code is not entered correctly (412), the user or the registrant is given another opportunity to correctly enter the code. Preferably, as described above, the registrant is given a limited number of opportunities to insert the registration code correctly, such as two or three attempts, before the telephonic connection is disconnected and the registrant must begin the registration process over again. This is primarily to conserve system resources. However, if the registrant correctly enters the code via telephone, the registration is complete and the registrant typically obtains a message such as "you have been verified and can now log in" (414) or the like indicating that the authentication and verification process has ended and that the registrant is given access to the web-site for the particular services for which registration was initiated.

Figure 5:
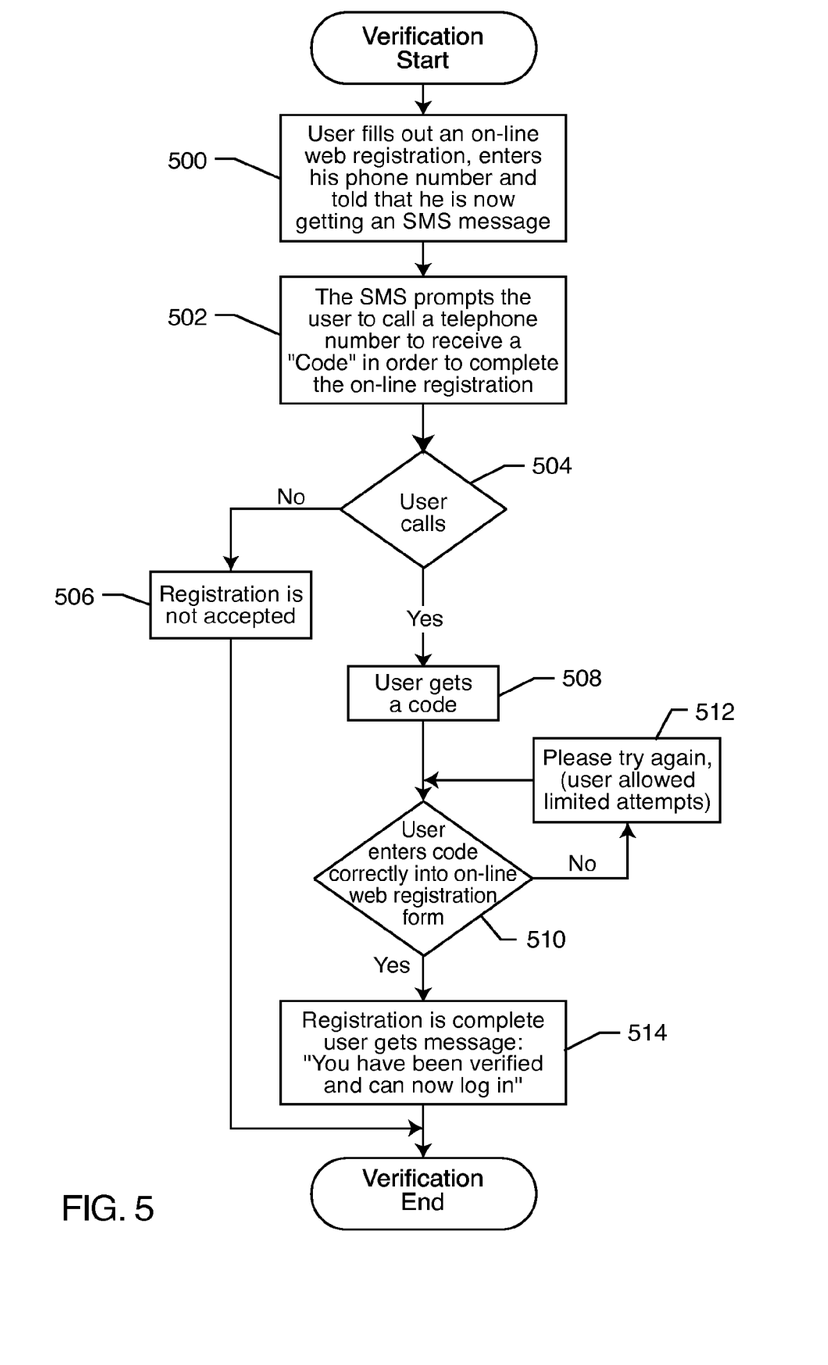
FIG. 5 is a flow chart depicting the steps taken in yet another embodiment of the present invention.

With reference now to FIG. 5, in yet another process for verifying an on-line registration embodying the present invention is shown. The registrant at least partially completes an on-line web registration form and is prompted to enter his telephone number, on the web-site. Typically, in this embodiment, the registrant is informed at the web-site that he is now getting an electronic message. In a particularly preferred embodiment, the electronic message is a Short Message Service (SMS) message which is a service for sending messages of up to a predetermined number of characters to mobile phones, such as those that use the Global System for Mobile (GSM) or CFMA communication to a telephone or the like. Although the electronic message can also comprise an e-mail message, instant message, page, or the like, SMS messages are preferred as they do not require that the mobile phone be active and within the range, and can be held for a number of days until the phone is active and within range. The SMS messages can be sent to digital phones from a web-site equipped with appropriate software and hardware such as PC Link, or even from one digital phone to another.

After the registrant has at least partially filled out the on-line web registration form, and entered his telephone number (500) on the web-site, the electronic message is sent to the registrant via telephone, prompting him to call a telephone number to receive a registration code in order to complete the on-line registration (502). The registrant is then given the opportunity to call the verification system (504). If the registrant does not, the registration is not accepted (506), and the registration and verification process ends. However, if the registrant calls the number given in the electronic message, the registrant is communicated a registration code (508), through the telephone connection. After obtaining the registration code, the registrant is given the opportunity to input the registration code correctly into the on-line web registration form (510), through the web-site. If the registrant does not correctly enter the registration code, the registrant is typically given additional opportunities to do so again (512). Preferably, as described above, the registrant is allowed a limited number of attempts to correctly enter the registration code. Typically, the registration code is short, such as three characters, so as to provide hundreds if not thousands of possible registration codes, but which is easy to write down and remember when properly obtained.

If the registrant correctly enters the registration code into the on-line registration form at the web-site, registration is complete and the registrant typically obtains message such as "you have been verified and can now log in" (514), which ends the verification and authentication process and enables the registrant to access the web-site or services provided to the web-site for which registration is required.

Figure 6:
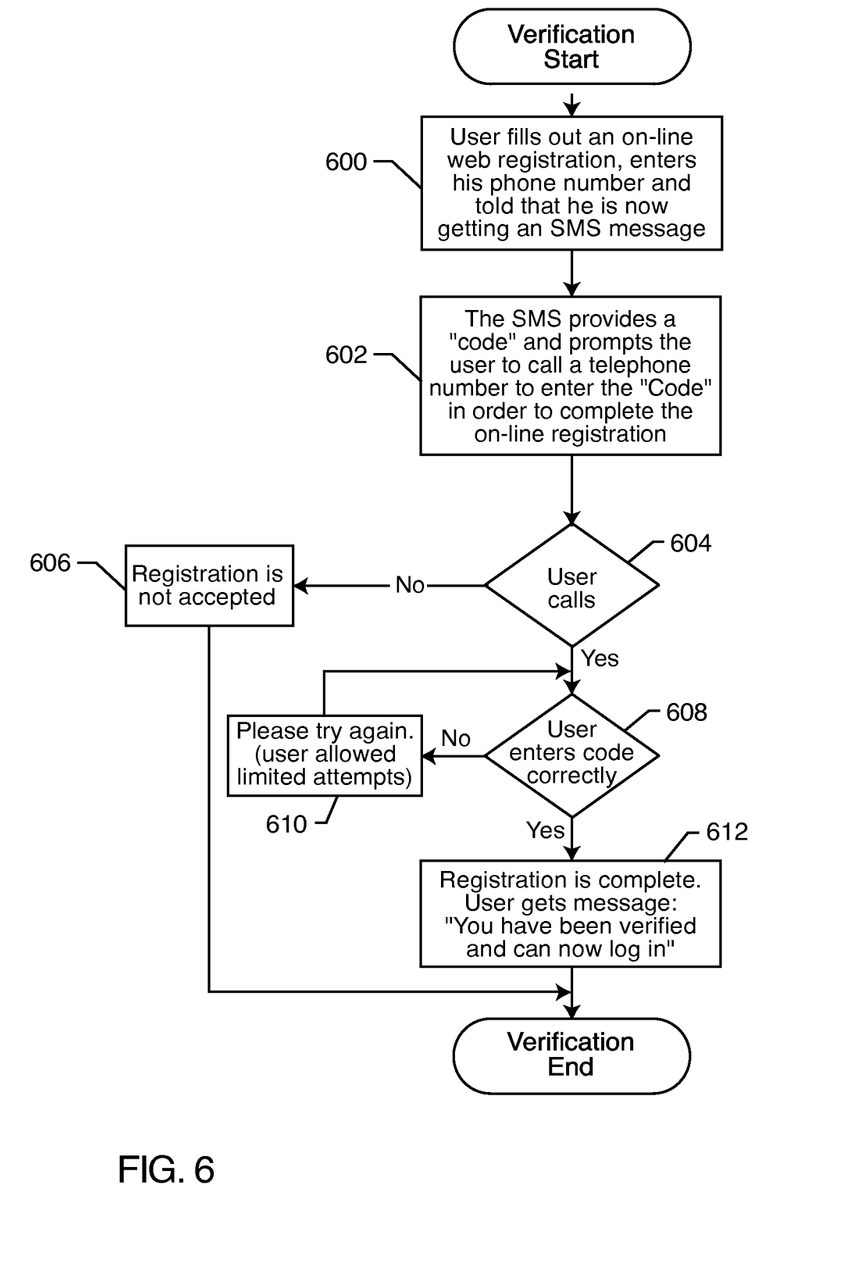
FIG. 6 is a flow chart depicting the steps taken in still another embodiment of the present invention.

With reference now to FIG. 6, a similar process to that of FIG. 5 is illustrated. In order to begin the verification and authentication process, the registrant is first presented an on-line registration form at the web-site, and during the registration process is prompted to enter his telephone number, through the web-site. Preferably, the registrant is informed that he will be getting an electronic message shortly (600), i.e., through the telephone. Similar to that described above, the message is preferably an SMS message, but can comprise other types of message services, such as e-mail messages, instant messaging, voice messaging, etc.

In this embodiment, the electronic message provides the registrant a registration code and prompts the registrant to call a verification system telephone number to enter the registration code in order to complete the on-line registration (602).

The registrant is then given an opportunity to call the telephone number (604). If the registrant does not call the telephone number (606), the registration is unaccepted and the registration process ends. However, if the registrant does call the telephone number provided in the electronic message, the registrant is given the opportunity to enter the code correctly via telephone (608). This can occur in a variety of ways. Typically, the system will be enabled with speech recognition software or the like such that the registrant can simply speak the registration code into the telephone when calling the number. However, the system can also be devised such that the telephone keypad or the like is used to enter the previously communicated registration code. If the registrant does not correctly enter the code (610), the registrant is typically given a limited number of additional attempts to correctly enter the registration code. However, if the registrant correctly enters the registration code by telephone, registration is completed and the registrant typically obtains a message such as "you have been verified and can now log in" (612), thereby ending the verification and authentication process and enabling the registrant to complete the registration process, log into the web-site or obtain the necessary services that the registration requires.

Figure 7:
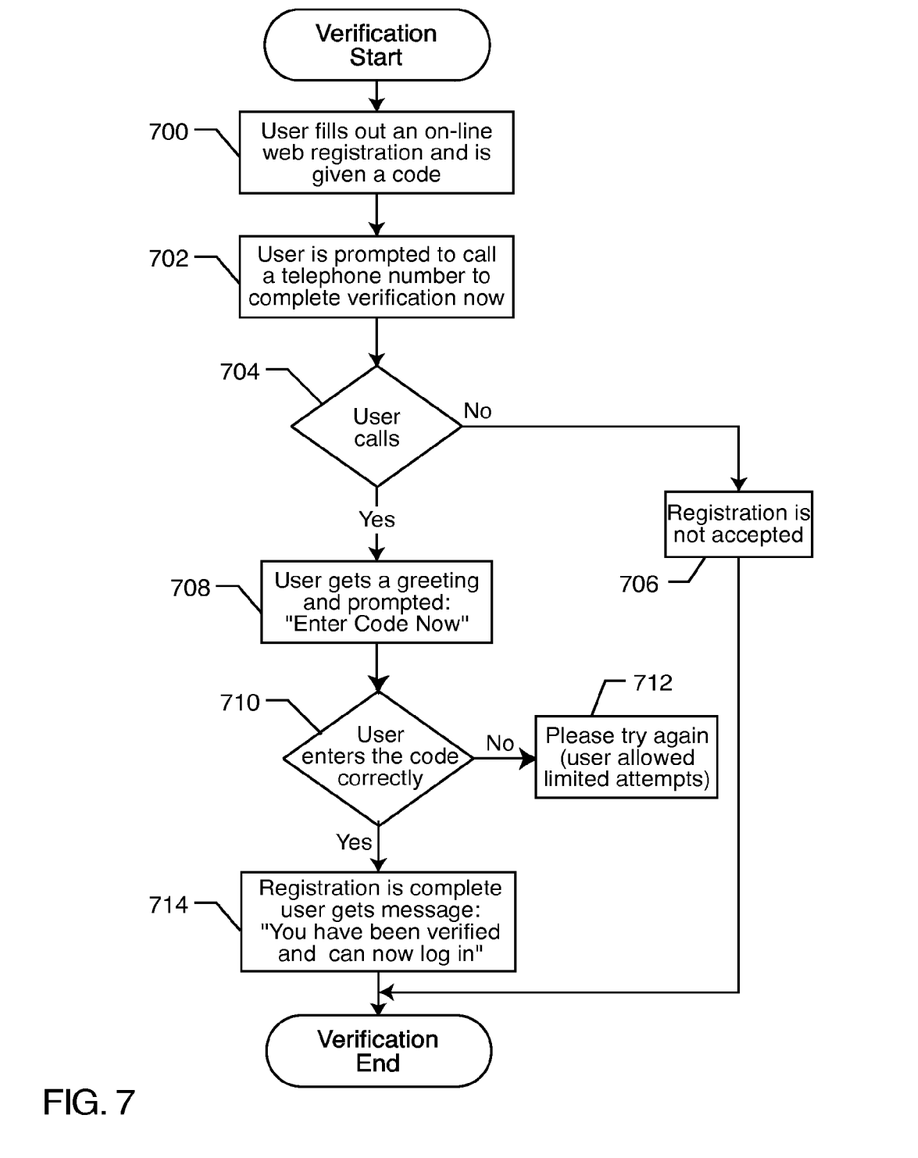
FIG. 7 is a flow chart depicting the steps taken in another embodiment of the present invention.

With reference now to FIG. 7, yet another embodiment of the process of the present invention is shown. In order to initiate the registration, verification and authentication process, the registrant first at least partially completes or fills out an on-line web-site registration form, and is given a registration code at that time (700), through the web-site. The registrant is prompted to call a telephone number provided at the web-site to complete the verification (702).

The registrant is then given the opportunity to call the verification system telephone number previously provided at the web-site (704). If the registrant does not call the telephone number, the registration is not accepted (706) and the registration process ends. However, if the registrant does call and establish a telephonic connection between himself and the verification system, the registrant gets a greeting and is prompted to "enter registration code now" (708) or the like.

The registrant then enters the registration code provided at the web-site via telephone (710). If the registrant does so incorrectly (712) the registrant is given additional opportunities to do so. However, such opportunities are usually limited, as described above. If the registrant does enter the code correctly, such as by voice or keypad entry using the telephone, the registration is complete and the registrant typically obtains a message such as "you have been verified and can now log in" (714) so as to end the verification and authentication process. With the registration complete and the telephone number of the registrant verified, the registrant is given access to the web-site, or services offered through the web-site for which registration was acquired.

Figure 8:
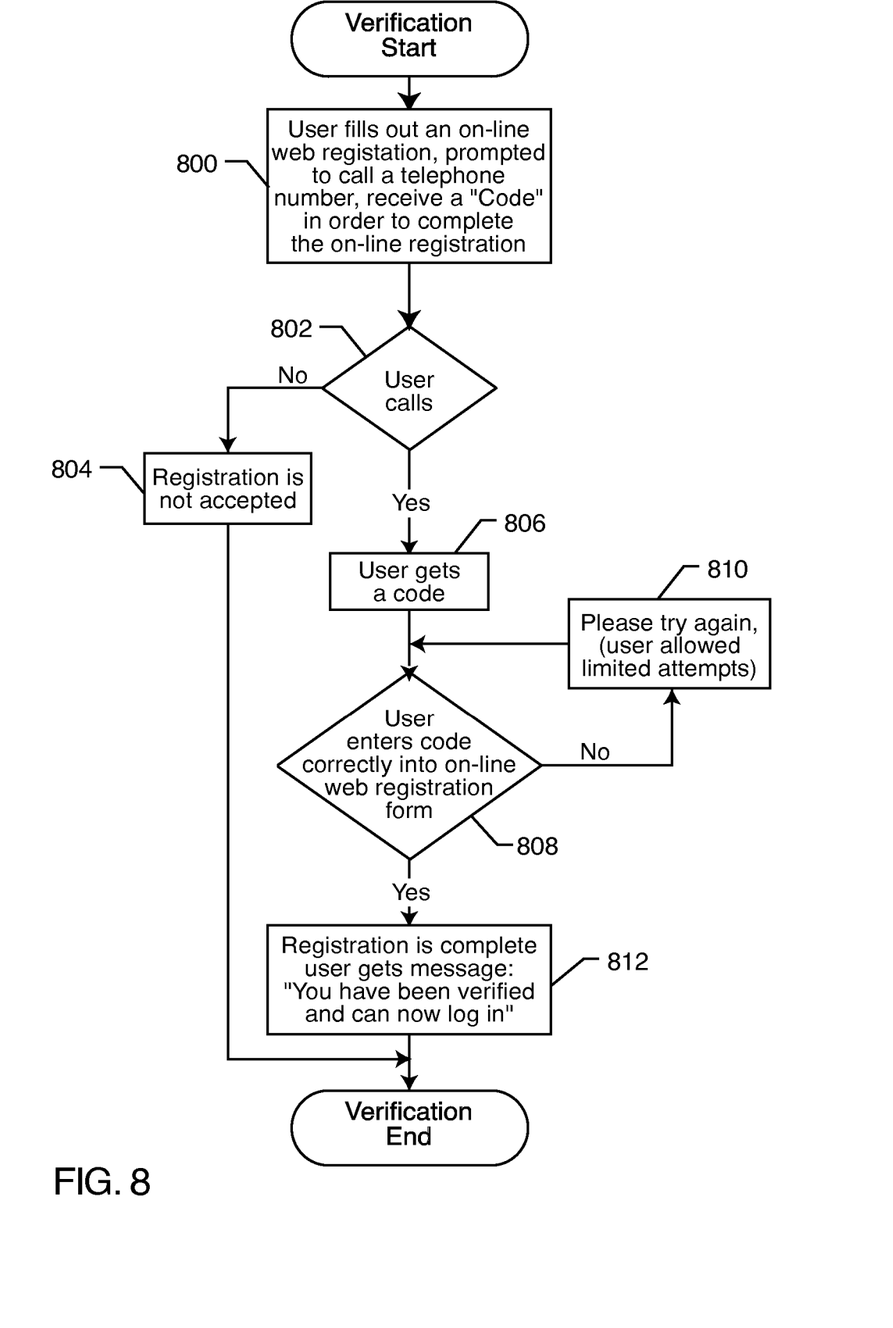
FIG. 8 is a flow chart depicting the steps in yet another embodiment of the present invention.

With reference now to FIG. 8, yet another embodiment of the process of the present invention is shown wherein in order to begin the registration and verification process, the registrant at least partially fills out an on-line registration form at a web-site. The registrant is prompted to call a telephone number of a verification system in order to receive a registration code in order to complete the on-line registration (800). The verification system telephone number is provided to the registrant at the web-site.

The registrant then calls the verification system telephone number (802). If the registrant does not (804), the registration is not accepted and the registration process ends. However, if the registrant does call the given verification system telephone number, the registrant is given a registration code (806), through the telephone connection.

The registrant then uses the registration code communicated by telephone and is given the opportunity to correctly enter the registration code into the on-line web registration form (808) at the web-site. If the registration code is not correctly entered, the registrant is typically given additional attempts to correctly do so (810). However, these attempts are typically limited in number so as to prevent fraud as unscrupulous registrants might attempt to randomly enter a registration code into the registration form at the web-site in an attempt to gain access without actually calling the verification system telephone number. It will be appreciated that by calling the verification system telephone number, the registrant's telephone number can typically be obtained by caller identification or the like. If the registrant correctly enters the registration code into the on-line registration form, registration is completed and the registrant obtains a message, typically, to the effect of "you have been verified and can now log in" (812), thus ending the verification and registration process.

Those skilled in the art will appreciate that in all of the previously described embodiments, a telephone connection is established between the verification system and the potential registrant in order to either obtain a registration code or to input a registration code. This method of telephone verification, in real-time, provides an additional layer of security, and thereby reduces fraud. The system can be automated so as to work twenty-four hours a day without the need to train employees or have staff on hand in order to create the telephone connection and complete registration.

The verification system, particularly during a registration process, may be used in conjunction with third party databases which contain personally identifiable information about consumers. The information given by the consumer, such as name, age, address, telephone number, social security number, etc., may be matched with this third party database to ensure the integrity of the information and the identity of the potential registrant. In such instances, the verification system may compare the third party database with the provided information before providing a verification code or placing a verification call to the potential registrant.

The present invention not only provides a method of verifying a potential registrant, such as through his or her telephone number by establishing connection on-line with the registrant as well as via a telephone connection, it is also designed and configured so as to provide notifications, alerts, information, etc., as established by either the registrant or business. Such notifications, alerts, etc., are achieved through the information provided by the registrant during the registration process, typically via the registrant provided telephone number. However, it will be appreciated by those skilled in the art that other notification means are possible, such as via e-mail, text messaging, or the like.

Figure 9:
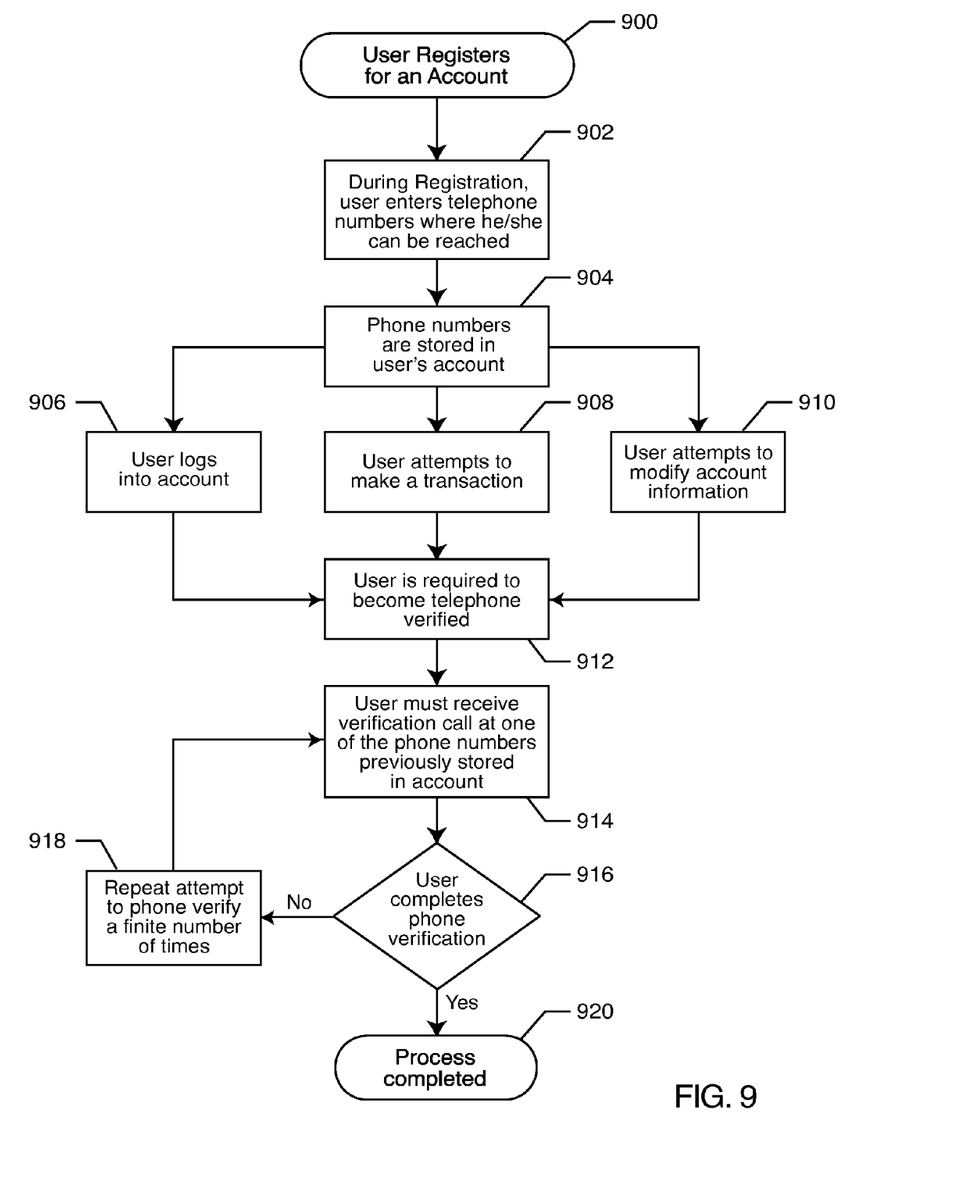
FIG. 9 is a flow chart depicting the steps taken in accordance with the present invention for registering and verifying a registrant as a prelude to notification.

With reference now to FIG. 9, in one embodiment, a user registers for an account (900), such as by filling out a registration form, which can be done as described above. During the registration process, the user enters one or more telephone numbers where he or she can be reached (902). Such numbers are stored in the user's account (904), and can be used in the verification process, as well as an alert or notification process.

For example, if the user logs into his or her account (906), attempts to make a transaction (908), or attempts to modify account information (910), the user may be notified or even required to become telephone verified (912). This can be established previously by the business, so as to prevent fraud on the business, or by the user/registrant in order to protect his or her identity and account status. For example, the process of the present invention can be used to thwart identity thieves otherwise trying to make an unauthorized transaction, obtain personal identifying information or account information, or modify account information to their benefit.

If a previously established event occurs, then the system will notify and/or verify the user. The user must receive a verification call at one of the phone numbers previously stored in the account (914). That is, a telephonic connection with the registrant is established, and an electronic message is sent. Electronic message includes the verification code, or provides means to obtain the verification code, such as a telephone number for the registrant to call to obtain the verification code. The electronic message may comprise an electronic message, such as a SMS (short message service) message received by registrant's telephone. Of course, the message can comprise a voice message alerting the user of the event. The user then completes the telephone verification (916), such as by entering the verification code into a form in a web-site or via the user's telephone using voice or keypad entry. This verifies the identity of the registrant/user, and provides confirmation of receipt of the information and, where necessary, authorization for the event to occur, such as access to the account, etc. If the code is incorrectly entered into the web-site or by phone, repeat attempts are allowed, but typically only a finite number of times so as to prevent automated dialers and the like from fraudulently entering an access code (918). However, once the verification and authorization is completed, the process is complete (920).

The system may be configured such so as to detect an answering machine message, and delay a predetermined amount of time before playing an automated message. Typically, however, during the registration process, the potential registrant/user indicates whether the provided telephone numbers are a direct line telephone number, or an indirect line, such as one answered by a receptionist or operator, or handled through an automated system, such as an PBX system.

Figure 10:
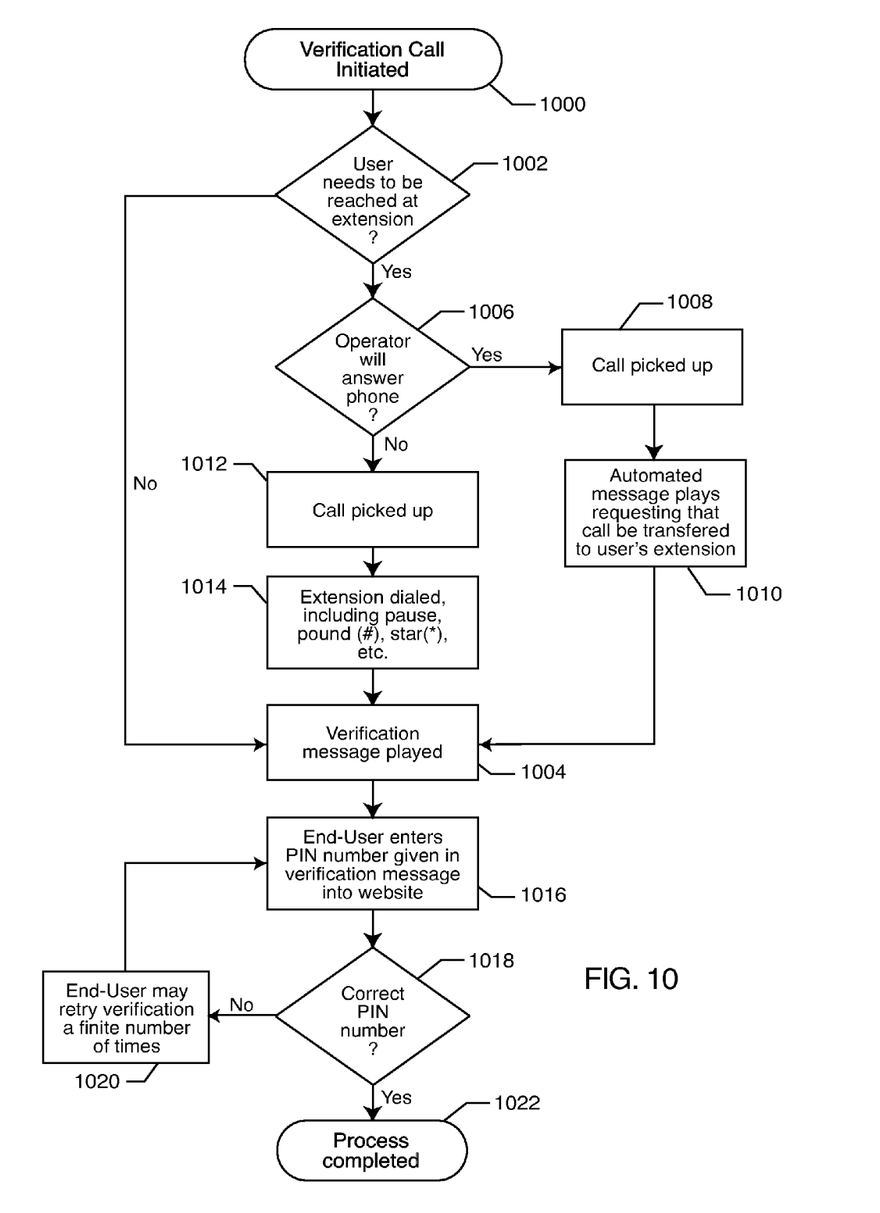
FIG. 10 is a flow chart depicting the steps taken in accordance with the present invention when the registrant is not contacted directly, but through an operator or automated message system.

In such instance, when a verification call is initiated (1000), as illustrated in FIG. 10, the system determines whether the user needs to be reached at an extension (1002). If not, the verification message is played once the telephone line is picked up (1004).

However, if the user needs to be reached at an extension, the system then determines whether an operator will answer the phone (1006). If so, when the call is picked up (1008), an automated message plays requesting that the call be transferred to the user's extension (1010). After directing the live operator to dial the extension, the call is paused for a predetermined amount of time. Then, the verification message is played (1004), which includes either the verification code and/or occurrence of the notification event.

If an operator does not answer the phone, but rather is an automated system, once the call is picked up (1012), the extension is automatically dialed, including any necessary pauses, additional numbers, such as pound or star signs, etc. (1014). Upon reaching the user's telephone line or message machine, the verification message is played automatically (1004).

In the instance where the verification message includes the verification code or personal identification number (PIN), the end user enters the PIN number given in the verification message into a web-site (1016). Of course, the user can also be asked to call a telephone number to enter the code, or even enter the code while on the line with the system. The system then determines whether the entered code is correct (1018) and, if not, the user is typically allowed to retry a finite number of times (1020), as discussed above. However, if the code is entered correctly, the process is completed (1022), and the user is verified either during the registration process, has confirmed receipt of the alert or information sought, or has authorized the transaction to occur.

During the registration process, when the user or consumer fills out a form, but is not able to or chooses not to phone verify using the verification system at the time of filling out the form, the system will preferably allow the consumer to reverify at a later time using a method that may include, but is not limited to, permitting the consumer to log into the web-site under the previous chosen user name, password, etc. The consumer's previously provided information, including address, telephone number, etc., will be stored in the system so the consumer does not need to reenter the information and can automatically be redirected to a page that will allow the consumer to attempt verification. The consumer must then phone verify, as described above, before they are able to access any area of the web-site that requires the user verification. Alternatively, an e-mail can be generated and sent to the consumer when there is a verification failure. The e-mail will contain a link to a page on the business' website where the consumer may reattempt to phone verify. The consumer previously entered information, such as name, address, user name, password, etc., will be stored in the business' system so the consumer need not have to reenter this information. The consumer must then phone verify before they are able to access any area of the web-site that requires user verification.

The verification system can be used at any point during a business transaction. For example, a merchant may verify a user before allowing the user to reach a transaction page. The merchant may also verify the user upon submission of a transaction, or after a transaction has been submitted. The merchant may verify after the transaction has been submitted to prevent hindering the completion of the transaction. Nonetheless, the verification system of the present invention is implemented in such a way as to make a fraudulent transaction more difficult by requiring a fraudulent user to gain access through the registrant's phone. This method of fraud prevention can be achieved, as indicated above, by collecting the consumer's phone numbers and storing these as part of the consumer's account. The business may choose to not allow the consumer to alter phone numbers associated with the consumer's account after initially collecting the numbers from the consumer, or require a safeguard process such as going through another registration process in order to add or change telephone numbers. Thus, when a consumer attempts to make certain transactions, as specified by either the consumer or the business, the consumer may be notified or alerted in a variety of way. For example, all the phone numbers on record may be called to alert or notify the consumer of the transaction, or to verify a consumer's transaction. However, a single phone number, such as a preferred phone number, may be set as the default number to call and alert or notify the consumer of the transaction. The consumer may be given the opportunity to choose which phone number is called and set as the default number.

The alert/notification aspect of the present invention can be implemented in a wide variety of scenarios. For example, with respect to ATM transactions, the business or consumer may wish the consumer to be informed of a transaction that meets certain qualifications, as previously set by the business or consumer. For example, the consumer may wish to be notified every time a withdrawal of more than one thousand dollars is requested from his or her checking account. Or, the business may wish to notify the consumer when more than five transactions post to the consumer's account within twenty-four hours. Other financial transactions can also be monitored and the consumer alerted. For example, with respect to credit card transactions, a consumer who is a parent may wish to be notified when the consumer's child makes a purchase or more than amount specified by the business or consumer. The business or consumer may wish to have a notification sent when the financial account is accessed, or sought to be altered in any way. The consumer may wish to be alerted by the business when a bank transaction occurs that meets certain qualifications. For example, a consumer may wish to be informed of his checking account balance every Friday at noon, when automatic withdrawals or payments are made, etc.

The present invention is not limited to notifying a user of events that occur with respect to a financial account. Instead, alerts or notifications can be given to the user for any reason. For example, the time of delivery of an item to the consumer can be automated in such a fashion. Sports scores or other user information can be relayed to the user as dictated by the business or user. The user may be informed of airline flight changes, traffic conditions, weather conditions, change in stock markets, status of credit reports, etc.

The verification can be imposed either by the business or consumer. The business may allow the consumer to "opt-in" to the system and charge the consumer each time the verification system is used. This creates a new string of revenue for the business. However, this also provides a service to the consumer. In certain circumstances, the business may require the user to use the verification system, and charge the consumer each time the verification system is used. This can be done, for example, to protect the business from financial losses due to identity theft, account information misappropriation, etc. For example, a credit card company may require that cardholders use the verification system, and be notified when certain suspect transactions occur, such as charging more then $500.00 in a single transaction, in order to limit the financial liability to the credit card company.

The business can choose to implement the verification system of the present invention with a call delay capability. This allows the consumer to choose when to receive the verification phone call. The business may allow the consumer to choose from various options, including, call in 10 minutes, call every 5 minutes if the line is busy, call every 10 minutes for up to three attempts, call me now, etc., during the registration process, or even during the notification process if the line is busy. This can be established during the registration process, as decided between the consumer and the business The business may also elect to automatically or manually require consumers to reverify after initial verification. This reverification process may occur at times, including, but not limited to, certain intervals of time, such as once every month. This can be done in order to ensure the integrity of the information. For example, this may be used to verify that the consumer can still be reached at the given telephone number. This process may also occur when a consumer requests another consumer to be verified, or even if the consumer chooses to be reverified at certain intervals, for example, to rest assured that the system is tracking their account.

The business, under certain circumstances, may elect to accumulate a database of verified members for use with various purposes. This database can comprise the third party database described above which could be used during the registration process to verify or authenticate the identity of the potential registrants. Such a database may also be used for marketing purposes, including, but not limited to, mass text messaging, mass verbal messaging, mass verbal calls, or any other way of communicating with a consumer directly through the telephone. This may be completed through automated systems, manual calling, or messaging.

With the advent of the CAN-SPAM Act of August 2004, a disclaimer may be provided when a consumer uses the verification system that notifies the consumer that the business may sent text message advertisements or notifications to the consumer's telephone unless he or she opts out. Once this permission is established, the business may then send commercial text messages at a time and quantity of its choosing until the consumer notifies the business that he or she wants to opt out in accordance with the CAN-SPAM Act. Businesses may use a community database of verified numbers to generate revenue by storing or selling numbers for third parties, as well as for their own use.

Although several embodiments have been described in detail for purposes of illustration, various modifications may be made without departing from the scope and spirit of the invention. Accordingly, the invention is not be limited, except as by the appended claims.

What is claimed is:

1. A verification and notification process, comprising:
   receiving information responsive to at least part of a registration form that is presented to the registrant on a web-site, the received information including at least one registrant electronic contact;
   verifying a received registrant electronic contact, wherein verifying the received registrant electronic contact includes:
      establishing a first telephonic connection with the registrant using the received registrant electronic contact;
      communicating a first communicated verification code to the registrant through the first telephonic connection; and
      receiving a first submitted verification code after it is entered by the registrant via the web-site and verifying the received registrant electronic contact if the first submitted verification code is the same as the first communicated verification code;
   establishing a notification event associated with the registrant;
   identifying an occurrence of the established notification event; and
   after identifying the occurrence of the established notification event, re-verifying the registrant electronic contact, wherein re-verifying includes:
      establishing a second telephonic connection with the registrant using the verified registrant electronic contact;
      communicating a second communicated verification code to the registrant through the second telephonic connection;
      receiving a second submitted verification code that is entered by the registrant via the web-site; and
      re-verifying the registrant electronic contact if the second submitted verification code is the same as the second communicated verification code.

2. The process of claim 1, wherein the at least one registrant electronic contact comprises at least one registrant telephone number.

3. The process of claim 2, wherein telephonic connections are established through a registrant telephone number.

4. The process of claim 2 further comprising:
   notifying the registrant of the occurrence of the established notification event by establishing a telephonic connection with the registrant via a registrant electronic contact.

5. The process of claim 4 wherein notifying the registrant comprises establishing a telephonic connection with the registrant via a registrant telephone number upon the occurrence of the established notification event.

6. The process of claim 2, wherein establishing a first telephonic connection with the registrant comprises sending the registrant an electronic message using the registrant telephone number.

7. The process of claim 6, wherein the electronic message includes the first communicated verification code or provides means to obtain the first communicated verification code.

8. The process of claim 6, wherein the electronic message comprises a text message.

9. The process of claim 8, wherein the text message is a short message service (SMS) message sent to a registrant's telephone or SMS-enabled device.

10. The process of claim 6, wherein the electronic message comprises a voice message.

11. The process of claim 6, wherein communication of at least one of the communicated verification codes to the registrant is via an automated message, and the process further comprises:
   detecting an answering machine message; and
   delaying a predetermined amount of time before playing the automated message.

12. The process of claim 11, wherein the automated message includes the at least one of the communicated verification codes.

13. The process of claim 1, wherein the website informs the registrant that an electronic message is being sent to the registrant via a registrant provided telephone number.

14. The process of claim 1, further comprising receiving an indication from the registrant indicating that the registrant telephone number requires an extension and an indication of whether a live operator will answer a call to the registrant telephone number.

15. The process of claim 14, wherein establishing a telephonic connection with the registrant comprises calling the registrant telephone number, playing an automated message directing the live operator to dial the extension, and pausing a predetermined amount of time, and wherein communicating a communicated verification code to the registrant comprises playing an automated message including the communicated verification code.

16. The process of claim 14, wherein establishing a telephonic connection with the registrant comprises calling the registrant telephone number, pausing a predetermined amount of time, automatically dialing the extension, and pausing a predetermined amount of time, and wherein communicating a communicated verification code to the registrant comprises playing an automated message including the verification code.

17. The process of claim 1, further comprising comparing information provided by the registrant in the registration form to a database containing personal identifying information.

18. The process of claim 17, wherein the personal identifying information includes at least one of: a name, a telephone number, an address, an email address, or a social security number.

19. The process of claim 1, wherein the established notification event pertains to fraud associated with an account of the registrant.

20. The process of claim 1, wherein the established notification event is a request to access an account associated with the registrant.

21. The process of claim 1, wherein the established notification event is a transaction.

22. The process of claim 1, wherein the established notification event is a request to alter an account associated with the registrant.

* * * * *

UNITED STATES PATENT AND TRADEMARK OFFICE
CERTIFICATE OF CORRECTION

| | |
|---|---|
| PATENT NO. | : 8,462,920 B2 |
| APPLICATION NO. | : 11/538989 |
| DATED | : June 11, 2013 |
| INVENTOR(S) | : Shlomo Gonen et al. |

It is certified that error appears in the above-identified patent and that said Letters Patent is hereby corrected as shown below:

In the Drawings

On sheet 8 of 10, in Figure 8, Reference Numeral 800, line 2, delete "registation," and insert -- registration, --, therefor.

On sheet 10 of 10, in Figure 10, Reference Numeral 1010, line 4, delete "transfered" and insert -- transferred --, therefor.

In the Specification

In column 6, line 14, delete "CFMA" and insert -- CDMA --, therefor.

In column 11, line 34, delete "then" and insert -- than --, therefor.

In column 11, line 45, delete "business" and insert -- business. --, therefor.

In the Claims

In column 14, line 15, in claim 16, delete "code ." and insert -- code. --, therefor.

Signed and Sealed this
Tenth Day of February, 2015

Michelle K. Lee
*Deputy Director of the United States Patent and Trademark Office*